United States Patent
Le et al.

(10) Patent No.: US 8,527,151 B2
(45) Date of Patent: Sep. 3, 2013

(54) SIDE IMPACT SAFETY SYSTEM WITH BLIND-SPOT DETECTION RADAR DATA FUSION

(75) Inventors: Jialiang Le, Canton, MI (US); Manoharprasad K. Rao, Novi, MI (US); Todd Clark, Dearborn, MI (US); Matt A. Niesluchowski, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 12/956,125

(22) Filed: Nov. 30, 2010

(65) Prior Publication Data
US 2011/0137528 A1    Jun. 9, 2011

Related U.S. Application Data
(60) Provisional application No. 61/267,205, filed on Dec. 7, 2009.

(51) Int. Cl.
*B60R 22/00* (2006.01)
*B60R 21/00* (2006.01)
*B60R 21/16* (2006.01)
*B60D 1/28* (2006.01)

(52) U.S. Cl.
USPC .............. 701/45; 180/271; 180/268; 280/734

(58) Field of Classification Search
USPC ................. 340/435, 436, 438, 440, 441, 903, 340/3.41; 701/29, 47, 46; 280/735, 730.2
See application file for complete search history.

(56) References Cited

U.S. PATENT DOCUMENTS

| | | | |
|---|---|---|---|
| 5,756,948 A * | 5/1998 | Husby et al. | 200/61.53 |
| 6,085,151 A * | 7/2000 | Farmer et al. | 701/301 |
| 6,243,632 B1 * | 6/2001 | Jung | 701/45 |
| 6,501,415 B1 * | 12/2002 | Viana et al. | 342/27 |
| 6,629,575 B2 * | 10/2003 | Nikolov | 180/282 |
| 6,859,148 B2 | 2/2005 | Miller et al. | |
| 7,161,472 B2 | 1/2007 | Strumolo et al. | |
| 7,191,043 B2 * | 3/2007 | Kawasoe et al. | 701/45 |
| 7,202,776 B2 * | 4/2007 | Breed | 340/435 |
| 7,394,355 B2 * | 7/2008 | Sjonell | 340/435 |
| 7,418,346 B2 * | 8/2008 | Breed et al. | 701/301 |
| 7,504,932 B2 * | 3/2009 | Bartels | 340/435 |
| 7,612,658 B2 | 11/2009 | Stopczynski | |
| 7,881,865 B2 * | 2/2011 | Ide | 701/301 |
| 8,014,921 B2 * | 9/2011 | Rao et al. | 701/45 |
| 8,235,432 B2 * | 8/2012 | Ryan et al. | 293/118 |
| 2004/0246113 A1 | 12/2004 | Strumolo et al. | |

(Continued)

*Primary Examiner* — Thomas Black
*Assistant Examiner* — Tyler Paige
(74) *Attorney, Agent, or Firm* — Frank A. MacKenzie; Brooks Kushman P.C.

(57) ABSTRACT

A motor vehicle blind-spot detection system has a remote sensor covering a rear-quadrant blind spot sensing zone and a forward-quadrant side impact sensing zone. A control module receives signals from a side impact sensor and the blind-spot detection sensor, calculates an approach vector of an object in the side impact sensing zone and/or the blind spot sensing zone, determines that the object will impact the vehicle, initializes a side impact algorithm controlling activation of an occupant safety device, detects an impact on the side of the vehicle and determines a magnitude of the impact, compares the magnitude of the impact with a threshold value established at least in part based upon the magnitude of the approach vector, and activates the occupant safety device if the magnitude of the impact exceeds the threshold value.

12 Claims, 6 Drawing Sheets

(56) References Cited

U.S. PATENT DOCUMENTS

| | | | |
|---|---|---|---|
| 2004/0254729 A1* | 12/2004 | Browne et al. | 701/301 |
| 2006/0069509 A1* | 3/2006 | Hayasaka | 701/301 |
| 2006/0167603 A1* | 7/2006 | Brandl et al. | 701/45 |
| 2006/0226640 A1* | 10/2006 | Prakah-Asante et al. | 280/735 |
| 2008/0082237 A1* | 4/2008 | Breed | 701/45 |
| 2008/0133136 A1* | 6/2008 | Breed et al. | 701/301 |
| 2008/0147253 A1* | 6/2008 | Breed | 701/3 |
| 2008/0269990 A1* | 10/2008 | Ghannam et al. | 701/45 |
| 2009/0244741 A1 | 10/2009 | Schondorf et al. | |
| 2011/0137528 A1* | 6/2011 | Le et al. | 701/45 |

* cited by examiner

SIDE IMPACT SAFETY SYSTEM WITH BLIND-SPOT DETECTION RADAR DATA FUSION

CROSS-REFERENCE TO RELATED APPLICATIONS

This application claims the benefit of U.S. provisional Application No. 61/267,205 filed Dec. 7, 2009 the disclosure of which is incorporated in its entirety by reference

BACKGROUND

1. Technical Field

The present invention relates to occupant safety systems for automotive vehicles, and more specifically to such systems for detecting a side impact and activating occupant restraints in response.

2. Background Art

Known side impact sensing systems use lateral accelerometers and/or air pressure sensors (typically located in a door cavity) to determine when a vehicle is involved in a side impact and to estimate the crash severity level after initial impact. With these sensors, it may take about 10 milliseconds to detect and confirm that the impact event has occurred. In general, it would be advantageous if the detection/confirmation time could be reduced, as this would leave more time for the activation/deployment of restraint systems.

SUMMARY

A vehicle safety system uses the remote object detection capability of a blind-spot sensing radar to supplement the conventional side impact sensing system described above. The system uses the blind-spot sensors (typically located adjacent the rear corners of the vehicle) to detect objects (fixed or moving) approaching the vehicle from the side, estimate/predict the impact velocity and location on the vehicle of the impact, and uses these estimates for side-impact protection decision-making. With the impact confirmation provided by one or more impact sensors at the side crash zone, the integrated system is able to sense the crash and estimate the crash severity earlier than is possible using the impact sensors alone. In many cases, even a relatively small reduction (e.g. 3-5 milliseconds) in side impact deployment decision-making time can improve occupant protection.

In an embodiment disclosed herein, a blind-spot detection system for a motor vehicle comprises at least one remote sensor located adjacent a rear corner of the vehicle. The remote sensor has a beam pattern covering a blind spot sensing zone disposed in a rear quadrant of the vehicle and a side impact sensing zone disposed in a forward quadrant of the vehicle. The vehicle further has at least one side impact sensor mounted at a side impact portion of the vehicle and an occupant safety device operable to protect an occupant during an impact on the side impact portion of the vehicle. A control module receives signals from the side impact sensor and the blind-spot detection sensor and is operative to:

calculate an approach vector of an object detected in the side impact sensing zone and/or the blind spot sensing zone;

determine, based on the approach vector, that the object is likely to impact the side impact portion of the vehicle;

initialize a side impact algorithm controlling activation of the occupant safety device;

detect, based on the signals received from the impact sensor, an impact on the side impact portion of the vehicle and determining a magnitude of the impact;

compare the magnitude of the impact with a threshold value established at least in part based upon the magnitude of the approach vector; and activate the occupant safety device if the magnitude of the impact exceeds the threshold value.

In another embodiment disclosed herein, a method of operating an occupant safety system of a motor vehicle in response to a side impact comprises:

operating at least one remote object detection sensor to detect a blind-spot threat object in a first sector rearward of the sensor and to detect a collision threat object in a second sector forward of the sensor;

calculating an approach vector of the collision threat object;

determining, based on the approach vector, that the collision threat object is likely to impact a side impact portion of the vehicle;

in response to the determination, operating a control module to initialize a side impact algorithm controlling activation of an occupant safety device;

operating at least one side impact sensor to detect an impact on the side impact portion of the vehicle and determine a magnitude of the impact;

comparing the magnitude of the impact with a threshold value established at least in part based upon the magnitude of the approach vector; and activating the occupant safety device if the magnitude of the impact exceeds the threshold value.

In another embodiment disclosed herein, a method of operating an occupant safety system of a motor vehicle in response to a side impact comprises:

operating an impact sensor to detect a magnitude of an impact on a side impact portion of the vehicle;

activating an occupant safety device if the impact magnitude exceeds a contact-only threshold value;

operating a blind spot detection sensor to detect an object in a forward quadrant relative to the vehicle;

determining, based on information from the blind spot detection sensor, that the object is likely to impact the side impact portion of the vehicle;

initializing a side impact algorithm in response to the determination that the impact is likely;

determining a magnitude of the impact and comparing the magnitude with a predictive threshold value established at least in part based upon the information from the blind spot detection sensor; and activating the occupant safety device if the magnitude of the impact exceeds the predictive threshold value.

BRIEF DESCRIPTION OF THE DRAWINGS

Embodiments of the present invention will now be described by way of example only with reference to the accompanying drawings in which.

DETAILED DESCRIPTION OF THE EMBODIMENTS

Figure 1:
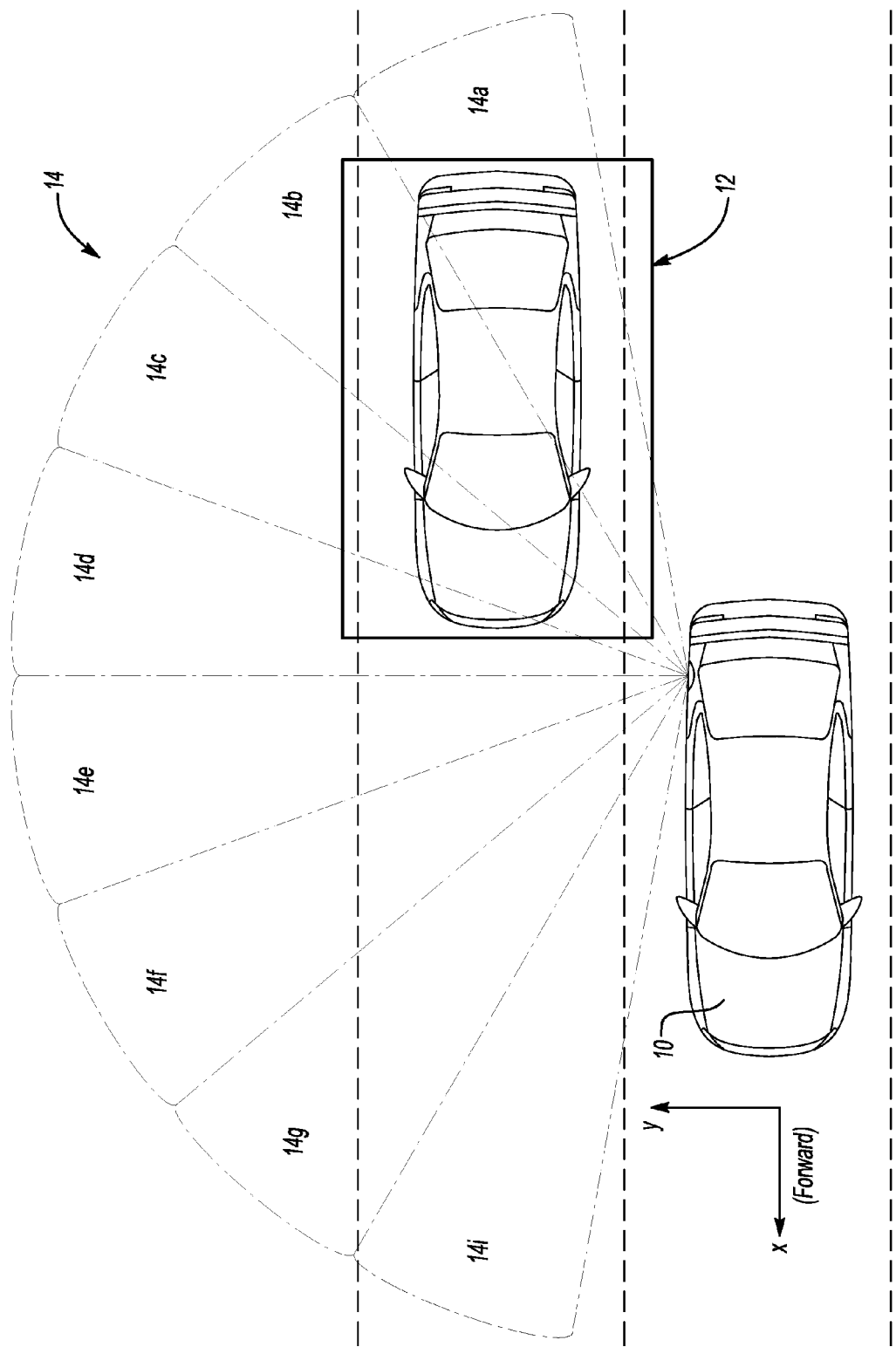
FIG. 1 is a schematic top view showing a host vehicle equipped with a radar-based blind-spot detection (BSD) system.

As seen in FIG. 1, a host vehicle 10 is equipped with a radar blind-spot detection (BSD) system of a type conventionally known in the automotive safety arts. Such a BSD system is adapted to detect vehicles (or other objects) present in a BSD sensing zone 12. BSD sensing zone 12 is intended to include the area beside and/or behind host vehicle 10 which may not be easily viewable using rear-view or side-view mirrors. This area is conventionally known as the blind-spot. A BSD system may generate various types of alerts or warnings (audible, visible, haptic, etc.) to notify the driver of the host vehicle that an object is present in the blind-spot.

Typically, the desired BSD sensing zone 12 is in the roadway lane adjacent to the lane occupied by the host vehicle 10 and lies within an approximately 90° sector relative the host vehicle. The sector or quadrant extends from a forward-most line extending outwardly (generally parallel with or slightly aft of the vehicle y-axis) from the rear fender or bumper of the host vehicle to a rearward-most line that is almost parallel with the vehicle x-axis. Any object detected within the BSD sensing zone 12 is considered to be a blind-spot threat object.

As seen in FIG. 1, the BSD sensing zone 12 is covered by radar beams 14a-14d. For ease of description, only the blind-spot on the right side of host vehicle is shown and discussed herein, but it is to be understood that a blind-spot may exist on the left side also, and that a BSD system may include sensors and other components to cover both blind-spots.

One known radar BSD system is produced by Valeo Raytheon Systems Inc. and utilizes a multi-beam mono-pulse radar capable of generating eight discrete beams (identified as 14a-14i in FIG. 1) giving an angular resolution of approximately 20 degrees and a total coverage of 150 degrees. In the Valeo system, a target must be confirmed by at least two beams to be identified as valid and cause an alert to be generated. The potential range of such a radar operating at 24 GHz is up to approximately 50 meters.

As seen in FIG. 1, the radar beam pattern 14 achievable by such a system may extend well forward of the BSD sensing zone 12, covering nearly the entire right side of host vehicle 10. The exact angular extent of coverage depends upon the antenna placement, beam width, number of beams, and other factors. The full amount of coverage available with this beam pattern is not utilized in a conventional BSD system, since the right-forward quadrant covered by beams 14e-14i is easily viewed by the driver of host vehicle 10 so no driver alert is necessary if an object is detected there.

Figure 2:
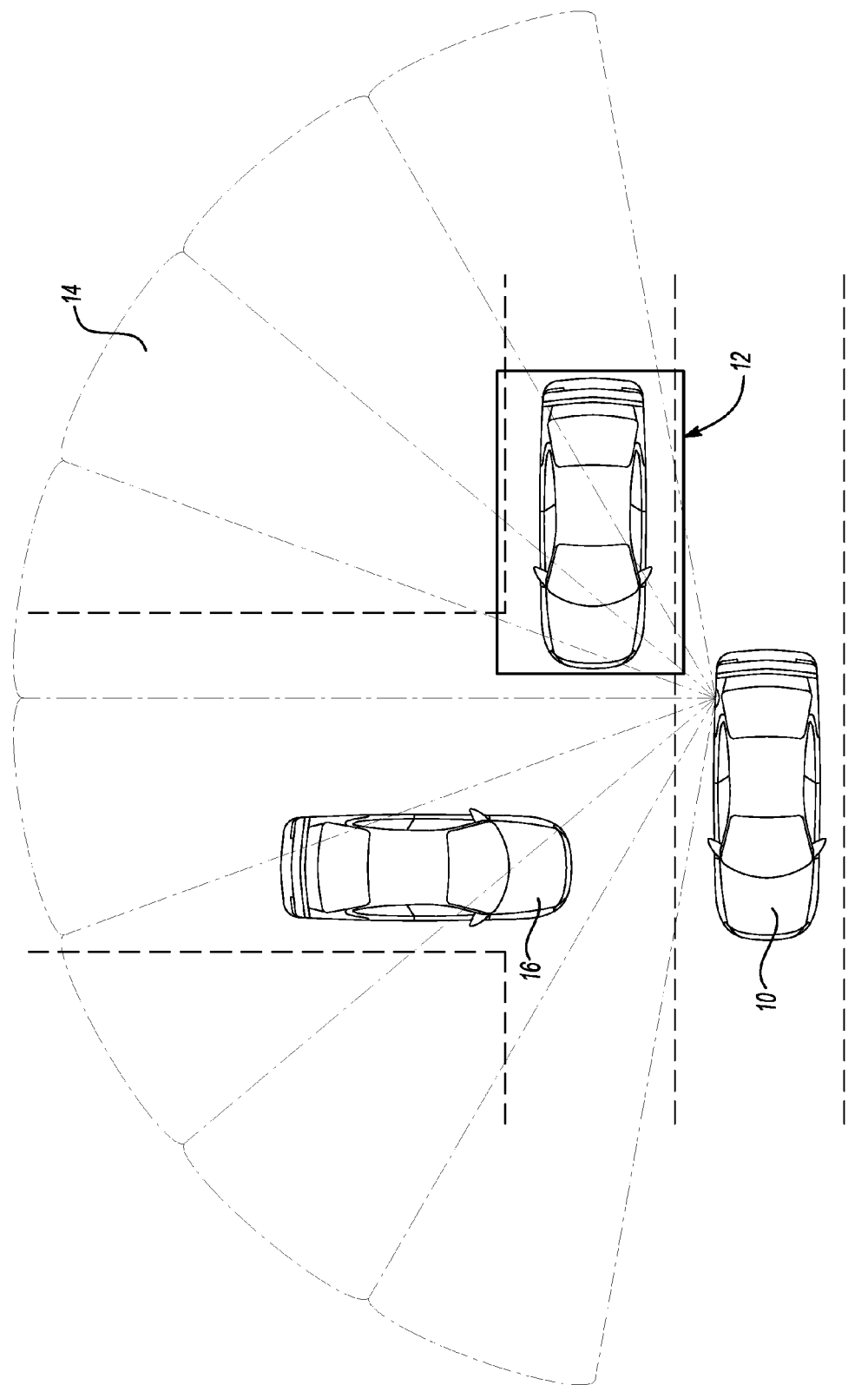
FIG. 2 is a schematic top view showing the host vehicle with a BSD System detecting a target vehicle approaching from the side.

FIG. 2 depicts how the remote object detection function of BSD system 12 may be utilized to advantage in side impact detection. A target vehicle 16 is shown travelling along a collision course relative to host vehicle 10, as may be the case at a roadway intersection (the vehicle lanes of which are indicated in dashed lines). As it approaches host vehicle 10, target vehicle 16 is well within the coverage of one or more of the forward beams 14e-14i. Thus, the same radar system hardware used in the conventional BSD system can be used for side impact sensing without incurring additional costs for sensor hardware. Any vehicle or other object detected by beams 14e-14i and approaching relative to the host vehicle 10 is considered to be a collision threat object.

Figure 3:
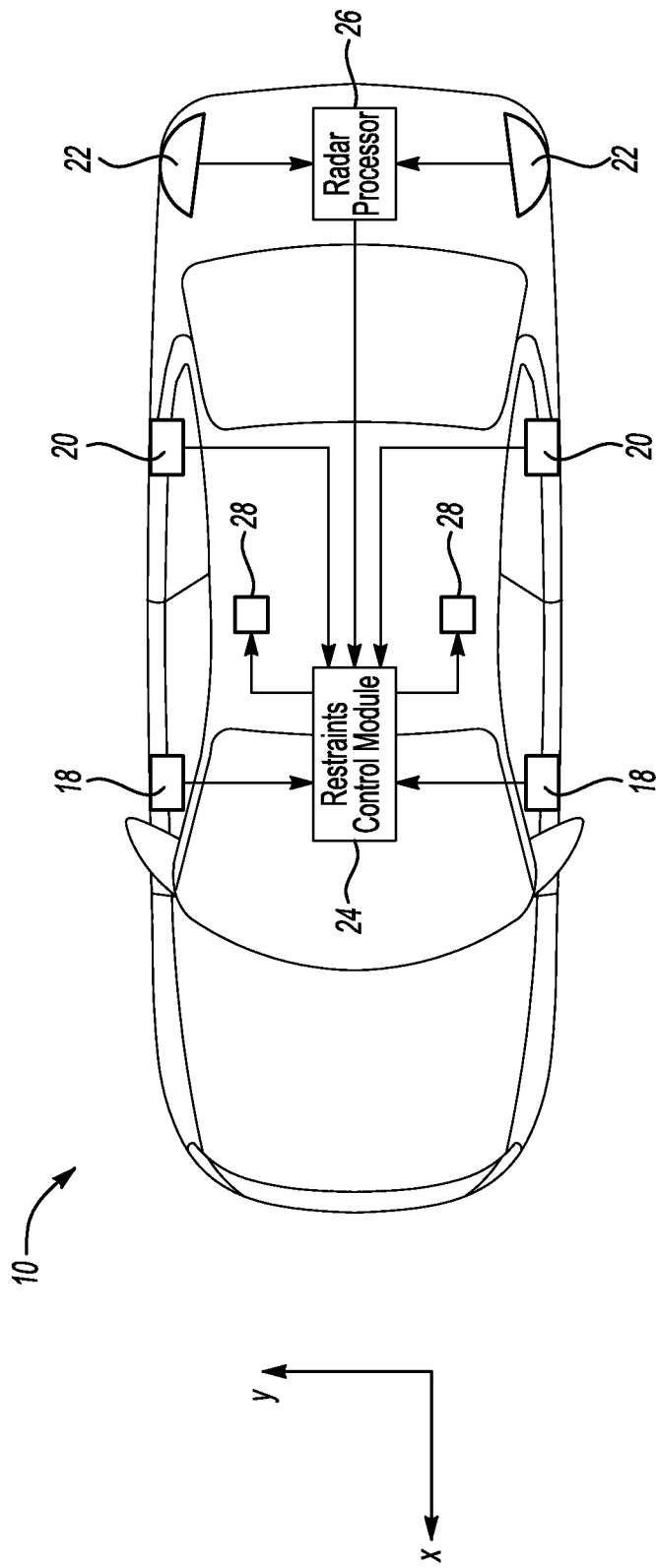
FIG. 3 is schematic system diagram showing components of an embodiment of the invention side protection system.

FIG. 3 shows an embodiment of a side impact sensing system as installed on host vehicle 10. The system comprises one or more side impact sensors of the type well-known in the automotive safety art and which may include, for example, air pressure sensors 18 in the left and right front door cavities, and lateral (y-axis) accelerometers 20 mounted at left and right C-pillar locations.

Two BSD radar sensors 22, as may be used in a conventional BSD system of the type described above, are shown mounted on the vehicle near the left and right rear corners of the vehicle in order to provide optimum coverage of the BSD zones.

A restraints control module (RCM) 24 receives inputs from side impact sensors 18, 20 and from BSD radar sensors 22. A radar signal processor 26 may, if required, be used to process the raw radar return data before passing it to RCM 24. RCM 24 may receive further inputs form other vehicle sensors (not shown) and uses available inputs to make restraint activation decisions and send activation commands to passenger restraints such as side airbags 28. Various other occupant safety systems (such as restraint belts, front airbags, curtain airbags, knee bolsters, etc.) may also be controlled by RCM 24, but these are omitted from FIG. 3 for clarity.

RCM 24 may be, as is well known in the art, a microprocessor-based device such as a computer having a central processing unit, memory (RAM and/or ROM), and associated input and output buses. RCM 24 may be an application-specific integrated circuit or other logic devices known in the art, and may include accelerometers for sensing crash pulses along both x and y axes of the vehicle.

Conventional blind-spot detection and warning functions based on signals from sensors 22 indicating the presence of a blind spot threat in the rear quadrant of the host vehicle 10 may be carried out by RCM 24 or by a separate control module.

Figure 4:
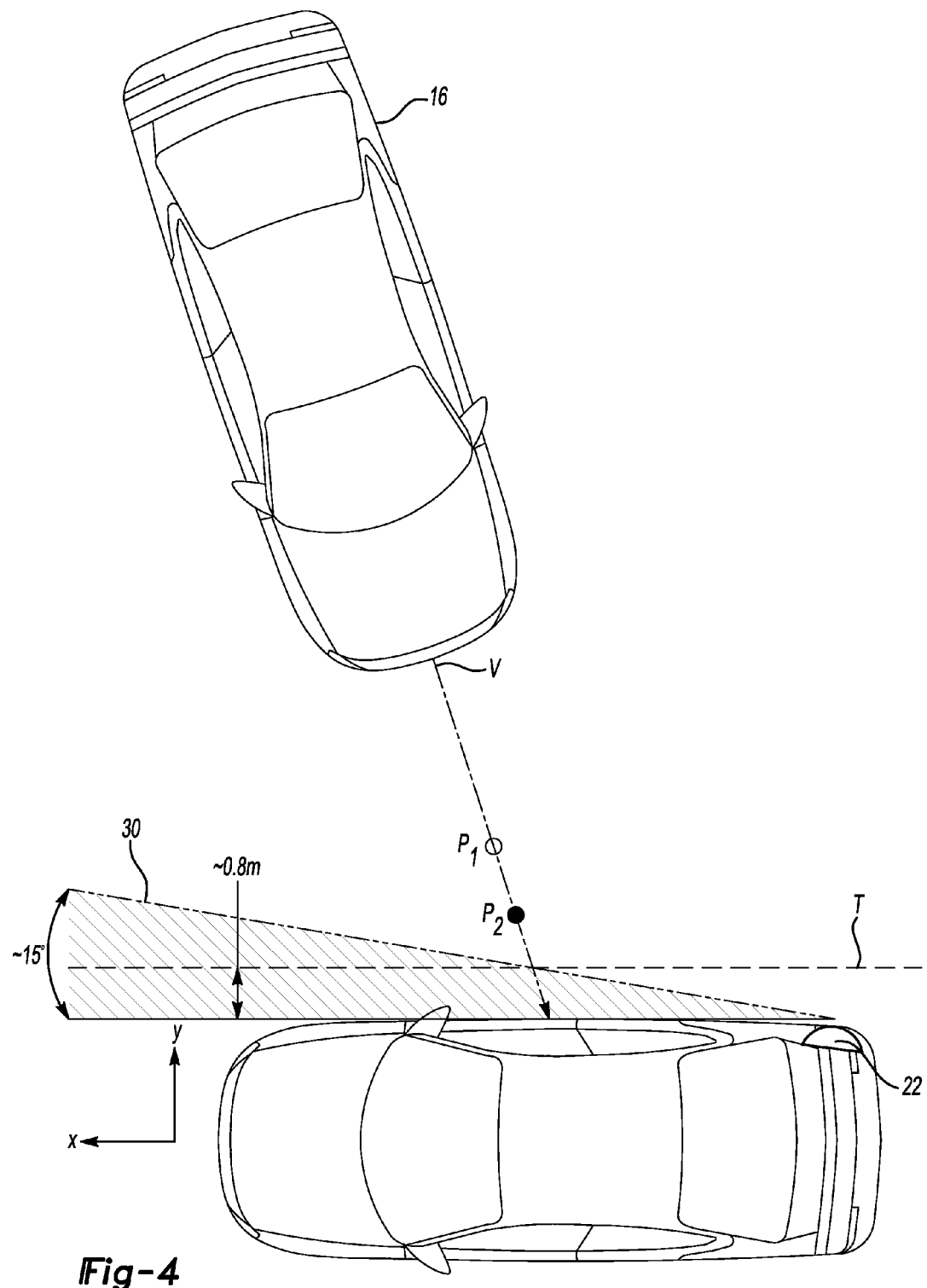
FIG. 4 is a schematic top view showing a calculated vector of a target vehicle on a collision-course, and a radar-blanked zone and related threshold line of a blind-spot detection radar sensor.

FIG. 4 illustrates a collision-course vector V of a target detected by the forward quadrant beams (14e-14i) of a BSD system radar. Vector V is calculated by tracking the target 16 as it moves relative to host vehicle 10 from a first position $P_1$ to a second position $P_2$. The vector V passing through first and second positions $P_2$, $P_2$ indicates the closing velocity, relative direction, and expected impact location on the side of the host vehicle, all of which may be calculated from the radar signal analysis.

As seen in FIG. 4, a BSD sensor 22 located near a right rear corner of host vehicle 10 may have an angular radar-blocked zone 30 (indicated in cross-hatch in lying close to the side of the vehicle. The radar-blocked zone 30 is a zone which is not covered by the radar antenna field and is a consequence of the BSD sensor 22 being located and aimed so that it provides optimum coverage of the blind-spot sensing zone 12, which (as described above) lies primarily in the right-rear (and left-rear) quadrant of the host vehicle. For a typical passenger vehicle, for example, the radar-blocked zone 30 may begin at a line approximately 15 degrees outward from the side of the vehicle. If the distance (measured along the x-axis) between the radar sensor 22 and a front door crash zone is 3 meters, then radar blocked zone 30 will extend approximately 0.8 m. along the y-axis from the surface of the front door. This distance is indicated by the threshold line T in FIG. 4. At the rear door crash zone, the blocked zone width will be less than 0.8 m.

When a target object travelling along vector V crosses threshold line T and enters radar-blocked zone 30, radar target detection must necessarily cease, however radar processor 26 and/or RCM 24 continue to estimate the track of the target (based upon last known position and relative velocity) until a collision between the target and the host vehicle is confirmed by impact sensors 18, 20. Various known techniques, such as Kalman filtering, may be used to accurately track and predict the path of the target object.

It is possible for a target vehicle 16 to be approaching host vehicle 10 on a collision-course from the right-rear quadrant and therefore to be detected by radar beams 14a-14d covering the blind-spot detection zone in that quadrant. The same tracking and vector calculation as described above is performed in such a case.

The side impact algorithm is preferably initialized at or just prior to when the target crosses threshold line T. Algorithm initialization may include (but is not limited to) switching from a steady-state or "background" mode to a crash-preparatory or "active" mode. In the active mode, the computer resources of RCM 24 may focus on side impact prediction and detection. RCM 24 may receives data/signals primarily from the pertinent sensors and perform calculations at a higher data-rate than in the background mode. For example, the signals from pressure sensor(s) 18 and/or satellite accelerometer(s) 20, and from vehicle state sensors, such as Inertial Measurement Unit (IMU) and wheel speed sensors (not shown) may be sampled/received at higher data rates. Accordingly, the side impact algorithm begins earlier and runs faster than is possible if only information from contact sensors 18, 20 is relied upon.

The side impact algorithm may involve activation of the appropriate restraint device when the detected level of pressure and/or acceleration (depending upon the type of sensor) reaches a threshold value that is lower than a contact-only (non-predictive) impact threshold value used in the absence of any predictive, pre-contact information from a remote sensor. The resulting reduction in restraint deployment time is achieved without the cost associated with adding remote sensor equipment to the vehicle, since BSD sensors 22 are already present on vehicles equipped with a BSD system.

Figure 5:
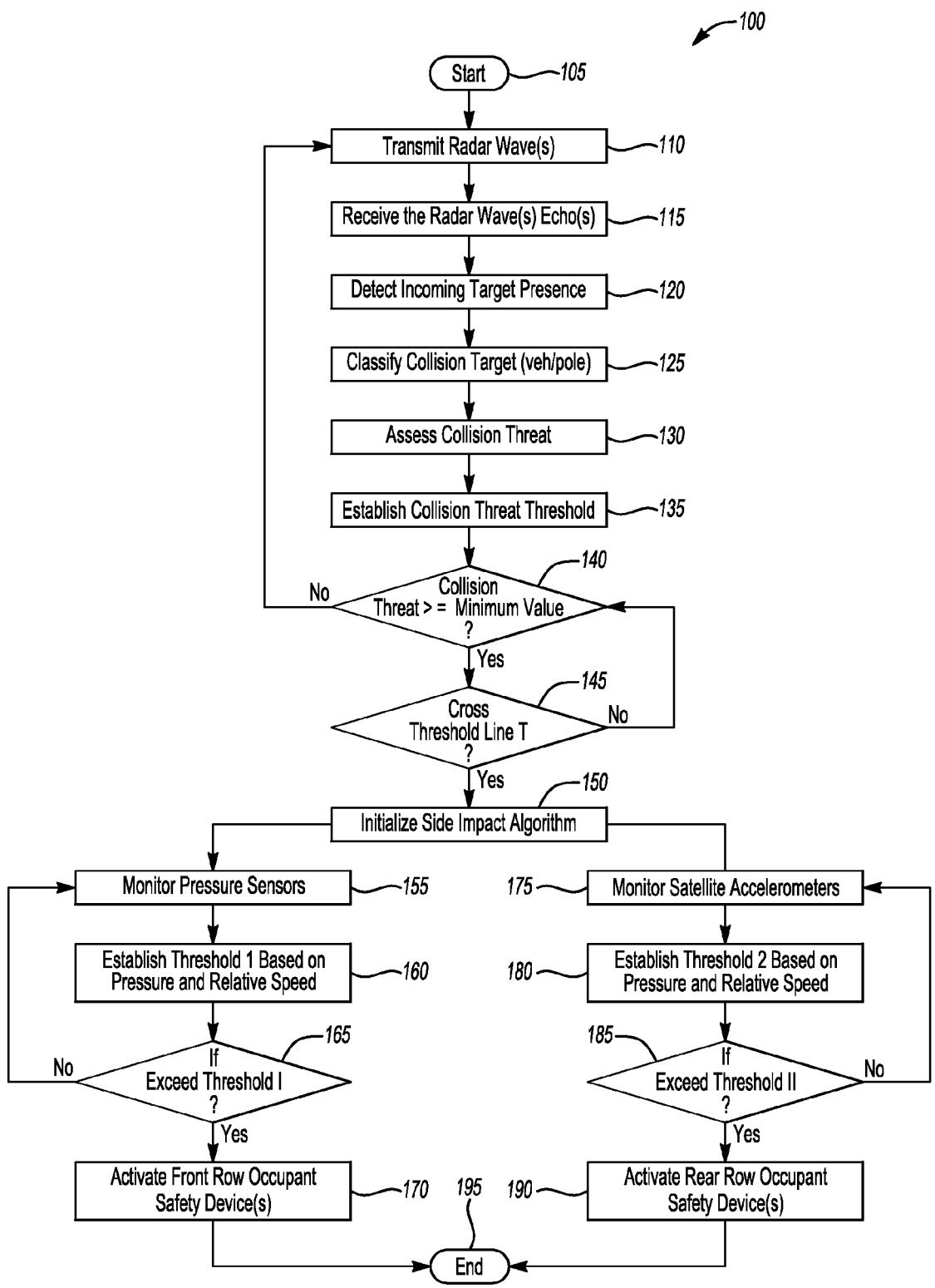
FIG. 5 is a block diagram of side impact algorithm according to an embodiment of the invention.

FIG. 5 shows a block diagram (100) of a side impact algorithm using blind-spot radar data fusion to improve reaction/activation/response time. The radar transmitter generates radio frequency (RF) waves that are broadcast through antennas of the blind-spot detection system (110). The transmitted RF waves come into contact with a target and are scattered in all directions. The scattered waves that are reflected back toward the host vehicle are received by the receivers, enabling the radar to detect the target (120). Based on the detected signals, signal processing can broadly classify any target objects (125) (for example, discriminating between a moving vehicle and a stationary pole), assess the collision threat (expressed as a probability, for example), and determine the expected impact location, impact velocity and impact direction (130).

If the collision threat exceeds a minimum value (140), and the target crosses the threshold line T (145) in a position indicating that a side impact is expected, a side impact algorithm is initialized (150). If the vehicle is equipped with impact sensors associated with a front door crash area and a discrete rear door crash area, the algorithm processing may follow two parallel paths, one for a predicted impact on the front door crash zone area and the other for a predicted impact on the rear door crash zone. For the path of front door crash zone, the signals from impact sensors nearest that zone (in this example assumed to be pressure sensors 18 as shown in the embodiment of FIG. 3) are obtained and processed (155). Using a predefined threshold value that preferably involves some combination of pressure and incoming velocity values (160), a deployment decision for restraint(s) associated with the front door crash zone will be made if the detected values exceed the Threshold 1 (165). For example, if the incoming velocity is relatively high the value of the pressure increase detected by a sensor 18 may be relatively low to meet Threshold 1, while if the incoming velocity is relatively low a higher detected pressure increase will be required. The lower required pressure increase in the first case will shorten the restraint activation time, which will be necessary if the target velocity is high. In any event, the required pressure increase to meet Threshold 1 will in most cases be a lower value than would be possible without target vector information from the blind-spot detection system, because the risk of a "false positive" activation is substantially reduced by the inclusion of the target vector information.

A similar procedure is applied to the path for rear door crash zone (175-190) using data from the impact sensors closet to the rear door crash zone (in this example assumed to be accelerometers 20 as shown in the embodiment of FIG. 3). The Threshold 2 value established (step 180) may be different from the Threshold 1 value, depending upon the particular type of impact sensor (pressure or accelerometer).

If the vehicle has only one crash zone identified on a side of the vehicle, only one of the two branches (155-170 and 175-190) shown in FIG. 5 is required.

Figure 6:
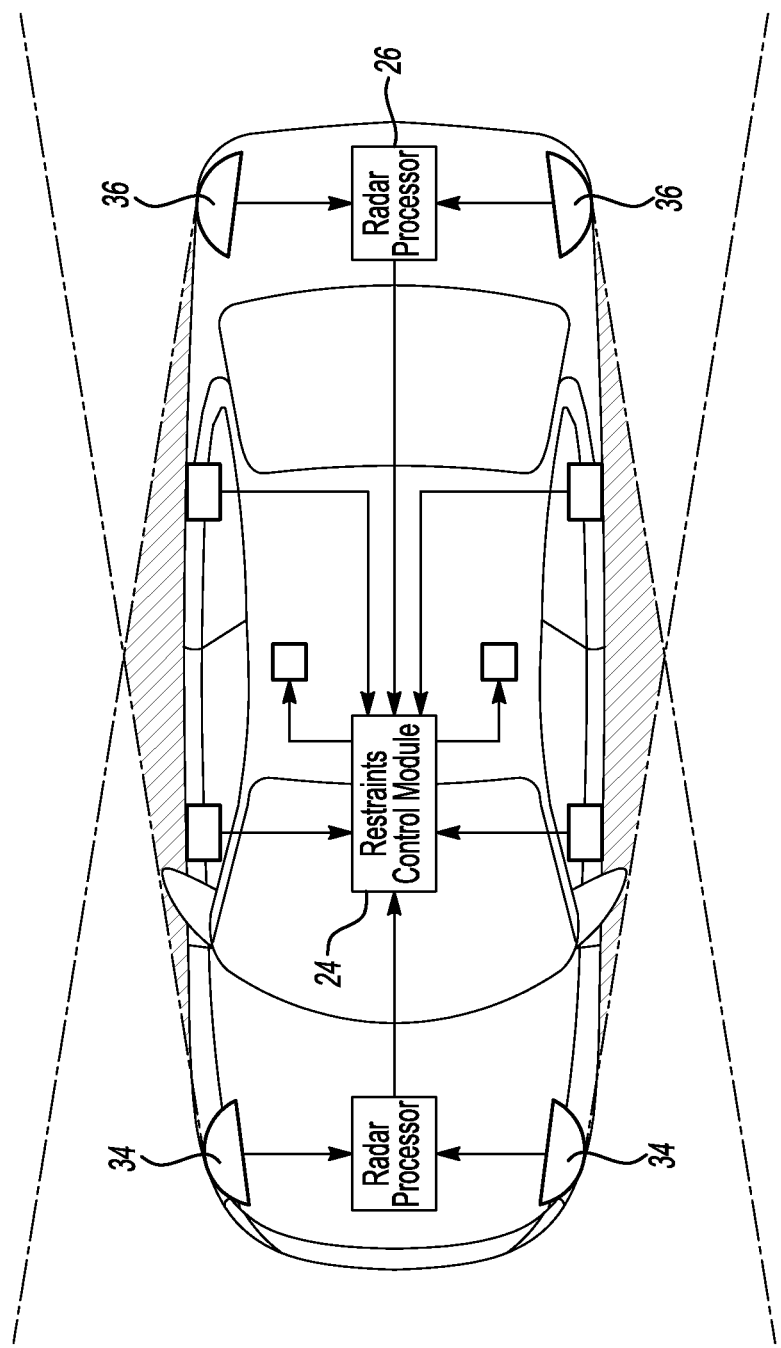
FIG. 6 is a schematic top view showing a vehicle equipped with both front and rear radar sensors.

As shown in FIG. 6, a side impact protection system may include both forward 34 and rear 36 radar sensors providing total side sensing capabilities without any radar blocked zones. Forward sensors 34 may be provided as part of a collision avoidance or mitigation system. In such a system, data from both sets of radar sensors 34, 36 can be used for more reliable prediction of side collision details. The two radars can be processed independently or fused together to increase robustness for side collision prediction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A motor vehicle comprising:
   a blind-spot detection system comprising a remote sensor located adjacent a rear corner of the vehicle and having a beam pattern covering a blind spot sensing zone disposed in a rear quadrant of the vehicle, the remote sensor further having a side impact sensing zone disposed in a forward quadrant of the vehicle;
   a side impact sensor mounted at a side impact portion of the vehicle;
   an occupant safety device operable to protect an occupant during an impact on the side impact portion of the vehicle; and
   a control module receiving signals from the side impact sensor and the blind-spot detection sensor and operative to:
   calculate an approach vector of an object detected in the side impact sensing zone and/or the blind spot sensing zone;
   determine, based on the approach vector, that the object is likely to impact the side impact portion of the vehicle;
   establish a side impact threshold value based at least in part upon the approach vector, the threshold value being less than a contact-only threshold value applied when approach vector information is not available;

detect, based on the signals received from the impact sensor, an impact on the side impact portion of the vehicle and determine a magnitude of the impact;

compare the magnitude of the impact with the side impact threshold value; and activate the occupant safety device if the magnitude of the impact exceeds the threshold value.

2. Apparatus according to claim 1 wherein the side impact sensing zone terminates at a threshold line spaced a threshold distance from the side impact portion of the vehicle, and the control module calculates the vector at a time when the object crosses the threshold line.

3. The apparatus according to claim 1 wherein the remote sensor is a multi-beam mono-pulse radar.

4. The apparatus according to claim 1 further comprising a second side impact sensor mounted at a second side impact portion of the vehicle, and the control module further operative to receive signals from the second side impact sensor, determine, based on the approach vector, that the object is likely to impact the second side impact portion of the vehicle, and activate the occupant safety device and/or a second occupant safety device associated with the second side impact portion.

5. The apparatus according to claim 4 wherein, if the object has impacted the second side impact portion of the vehicle, the control module compares the magnitude of the impact with a second threshold value associated with an impact on the second side impact portion.

6. The apparatus according to claim 5 further comprising a second occupant safety device associated with the second side impact portion, and the control module activates the second occupant safety device if the magnitude of the impact exceeds the second threshold value.

7. A method of operating an occupant safety system of a motor vehicle in response to a side impact comprising:

operating a remote object detection sensor to detect a blind-spot threat object in a first sector rearward of the sensor and to detect a collision threat object in a second sector forward of the sensor;

calculating an approach vector of the collision threat object;

determining, based on the approach vector, that the collision threat object is likely to impact a side impact portion of the vehicle;

in response to the determination, establishing a side impact threshold value based at least in part upon the approach vector, the threshold value being less than a contact-only threshold value applied when approach vector information is not available;

operating a side impact sensor to detect an impact on the side impact portion of the vehicle and determine a magnitude of the impact;

comparing the magnitude of the impact with the threshold value; and activating the occupant safety device if the magnitude of the impact exceeds the threshold value.

8. The method according to claim 7 wherein the determination that the collision threat object is likely to impact the side impact portion of the vehicle is made when the object reaches a limit of coverage of the remote object detection sensor closest to the side impact portion of the vehicle.

9. The method according to claim 7 further comprising:

determining, based on the approach vector, that the collision threat object is likely to impact a second side impact portion of the vehicle; and operating a second side impact sensor to detect a second impact on the second side impact portion of the vehicle and determine a magnitude of the second impact.

10. The method according to claim 9 wherein, if the object is likely to impact the second side impact portion of the vehicle, comparing the magnitude of the second impact with a second threshold value associated with an impact on the second side impact area.

11. The method according to claim 10 further comprising activating a second occupant safety device associated with the second side impact portion if the magnitude of the second impact exceeds the second threshold value.

12. A method of operating an occupant safety system of a motor vehicle in response to a side impact comprising:

operating an impact sensor to detect a magnitude of an impact on a side impact portion of the vehicle;

activating an occupant safety device if the impact magnitude exceeds a contact-only threshold value;

operating a blind spot detection sensor to detect an object in a forward quadrant relative to the vehicle;

determining, based on information from the blind spot detection sensor, that the object is likely to impact the side impact portion of the vehicle;

establishing a side impact threshold value based at least in part upon the information from the blind spot detection sensor, the threshold value being less than a contact-only threshold value applied when information from the blind spot detector is not available;

determining a magnitude of the impact and comparing the magnitude with the threshold value; and activating the occupant safety device if the magnitude of the impact exceeds the predictive threshold value.

\* \* \* \* \*